No. 800,835. PATENTED OCT. 3, 1905.
F. A. SEIBERLING.
VEHICLE WHEEL.
APPLICATION FILED MAR. 9, 1905.
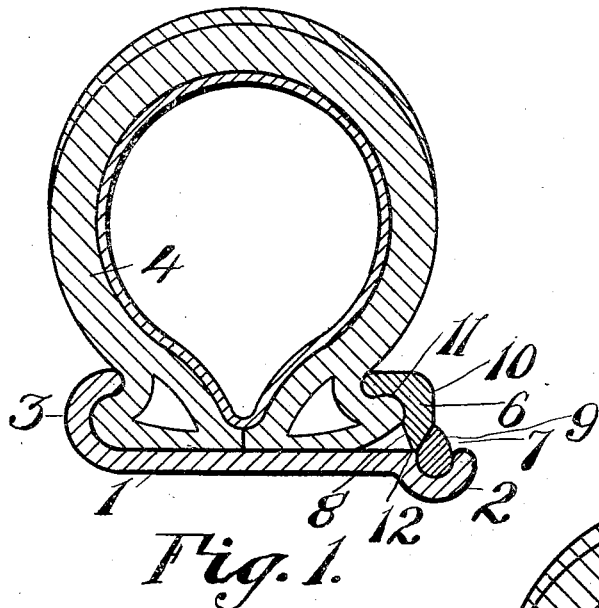
Fig. 1.
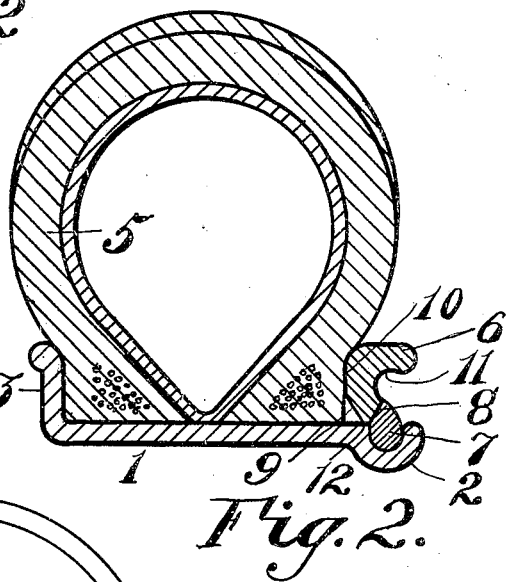
Fig. 2.
Fig. 4.
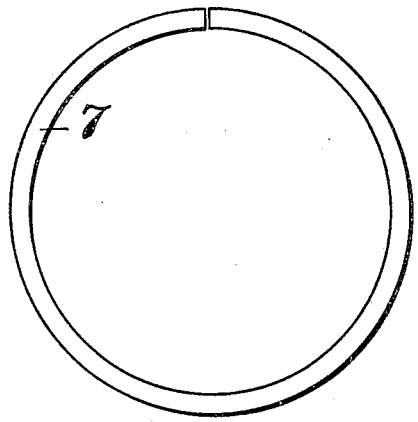
Fig. 3.
Witnesses:
A. E. Kling
Glenara Foy
Inventor,
F. A. Seiberling
by C. E. Humphrey.
Atty.

UNITED STATES PATENT OFFICE.

FRANK A. SEIBERLING, OF AKRON, OHIO.

VEHICLE-WHEEL.

No. 800,835.          Specification of Letters Patent.          Patented Oct. 3, 1905.

Application filed March 9, 1905. Serial No. 249,242.

*To all whom it may concern:*

Be it known that I, FRANK A. SEIBERLING, a citizen of the United States, residing at Akron, in the county of Summit and State of Ohio, have invented new and useful Improvements in Vehicle-Wheels, of which the following is a specification.

This invention relates to vehicle-wheels provided with pneumatic, solid, or cushion tires of elastic material, more particularly pneumatic tires of the double-tube type, having contractible, inextensible, or semi-inextensible bands or edges; and the object thereof is to so construct the wheel as to enable the tire to be very quickly applied or removed when necessary.

The invention further aims to provide a wheel of the class referred to with a new and improved holdfast means for the tire, hereinafter more specifically described, said means fixedly securing the tire in position, so that the tire will not be displaced in any manner, and said means being removable as well as reversible to enable its use in connection with tires of various constructions.

The invention further aims to provide a vehicle-wheel of the class referred to with a new and improved rim hereinafter more specifically described, said rim coöperating with the holdfast means for the tire, said rim and means being simple in construction, strong, durable, efficient in use, comparatively inexpensive to manufacture, readily applied to ordinary forms of wooden-felled wheels or those using metal spokes, and enables a tire to be readily secured or removed when occasion requires.

With the foregoing and other objects in view the invention consists of the novel construction, combination, and arrangements of parts constituting the wheel, to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

In the drawings, wherein like reference characters denote corresponding parts throughout the several views, Figure 1 is a cross-section of a rim and tire portion of a wheel constructed in accordance with this invention, also showing, in section, the holdfast means for securing the tire, said holdfast means arranged in operative relation with respect to that form of tire known as the "clencher" type. Fig. 2 is a like view showing the arrangement of the holdfast means in operative relation with respect to another form of tire. Fig. 3 is a side elevation of the locking device for retaining the holdfast means in position, and Fig. 4 is a transverse section illustrating the reversibility of the tire-holding means.

Referring to the drawings, 1 denotes a flat rim having one side formed with an endless offset 2, of approximately the shape shown in the drawings in cross-section and forming a seat for the purpose hereinafter set forth. Said offset 2 is on the level or depends below the face of the upper face of the rim, and the other side of the rim 1 may be formed with an upwardly-extending endless flange 3, forming an abutment or tire-retaining device for the purpose hereinafter set forth, or it may be provided with a seat similar to the offset 2, or any other preferred or desired means may be employed which will hold that side of the tire which is to seat on the rim securely in place.

The holdfast means for the tire, whether it be used for the form of tire shown in Fig. 1, which is indicated by the reference character 4, or whether it be used for the form of tire shown in Fig. 2, which is indicated by the reference character 5, consists of an endless tire-retaining device 6 and a split locking-ring 7 therefor. The tire-retaining device 6 is removable as well as reversible, and where these devices are used on both sides of a wheel-rim they are also interchangeable. The retaining device 6 is in the form of an endless ring and is provided with bearing-surfaces 8, 9, 10, 11, and 12. The function of the bearing-surfaces will be hereinafter referred to and more fully described. The locking device consists of a split ring 7 and may be of various forms, preferably substantially the same in cross-section, as shown in the drawings; but at least one of the bearing-surfaces of the retaining device 6 should conform to the shape of the ring 7. The lower side portions of the tire-retaining device 6 are beveled or inclined outwardly at an angle with the flat bottom portion 12 of the device. The inclination of these beveled sides 8 and 9 of the tire-retaining device 6 are substantially equal, so as to permit the reversing in position of the tire-retaining device on the rim 1.

In constructing the split locking-ring 7 it may be made tubular or solid, as desired, but must be provided with an inclined or beveled upper portion equivalent in inclination to the sides 8 and 9 of the tire-retaining device 6.

Fig. 4 illustrates the reversibility of the tire-holding means, and in the said figure the reference character 13 denotes the rim, having an offset 14 at each side, forming a pair of seats, and within each of said seats is arranged a locking-ring 7, and the said locking-rings 7 are adapted to bear against the tire-holding means. It is evident from the construction shown by way of example that the tire-holding means can be readily reversed and still perform their function.

In assembling a wheel for use in connection with the tire 4 the bearing-surface 9 of the retaining device 6 bears against the locking-ring 7, which is mounted within the offset 2. The curvilinear bearing-surface 11 clenches the base portion of the tire 4, and when the tire is inflated the pressure is against this curvilinear surface 11 of the retaining device, which causes the device to securely retain itself upon the rim 1 and the locking-ring 7. At the same time the retaining device 6, which is arranged in operative relation with respect to the ring 7, is securely locked by said ring 7 in position.

It will be stated that the retaining device is set up in operative position before the ring 7 is seated in the offset 2. After the retaining device 6 is in position the ring 7 is sprung into the offset or its seat, consequently forming what is termed a "locking" device for the tire-retaining device. Although the locking device is intended to keep the retaining device from slipping off the rim the retaining device itself automatically locks the locking device in its seat when the tire is being inflated and afterward. By this arrangement the locking device cannot be taken out of its seat or accidentally displaced without first deflating the tire and then moving the endless retaining device toward the center of the rim, when the locking device can be quickly detached by springing it out of its seat.

When setting up a wheel when a tire of the form shown in Fig. 2 is employed, the retaining device is reversed and the bearing-surface 8 of said retaining device bears against the beveled face of the ring 7. Of course the flat bearing-surface 12 engages the upper face of the rim 1 in the same manner as has been described with respect to Fig. 1. The action of the retaining device in this arrangement secures or holds the tire upon the rim and locks the locking device in the offset, the same as heretofore referred to.

What I claim, and desire to secure by Letters Patent, is—

1. In a vehicle-wheel, the combination with a rim and a tire-holder locking device, of a tire-holder adapted to be engaged by said locking device, said tire-holder consisting of an endless ring provided with a bearing-surface to engage said rim, and with two outwardly-inclined beveled bearing-surfaces, both of which beveled surfaces conform in inclination to said locking device.

2. A vehicle-wheel comprising a rim having an offset at one side, said offset forming a seat, a reversible tire-holding means mounted on said rim and having two outwardly-beveled sides, a locking device mounted in said seat having a beveled upper portion adapted to engage said holding means and retain the same on said rim.

3. A vehicle-wheel comprising a rim having a seat and an offset at one side thereof, an endless tire-holding element mounted on said rim, provided with an outwardly-sloping beveled side portion, and a split locking device having a beveled upper face corresponding in contour to the beveled side portion of said element mounted in said seat and engaging said holding device for securing the latter in position.

In testimony whereof I have hereunto set my hand in presence of two subscribing witnesses.

FRANK A. SEIBERLING.

Witnesses:
C. E. HUMPHREY,
GLENARA FOX.